Patented Aug. 27, 1935

2,012,622

UNITED STATES PATENT OFFICE 2,012,622

HETEROCYCLIC-ESTERS OF RESIN ACIDS

Joseph N. Borglin, Wilmington, Del., assignor to Hercules Powder Company, Wilmington, Del., a corporation of Delaware No Drawing. Application June 11, 1932, Serial No. 616,747. Renewed January 24, 1935

17 Claims. (Cl. 260—54)

This invention relates to a new composition of matter and method of producing it.

The new composition of matter in accordance with this invention comprises essentially the reaction product of a monohydric heterocyclic alcohol and abietic acid, a resin acid as pimaric acid, etc. The reaction is more particularly an esterification and the product is essentially an abietate or abietic acid ester, and may be polymerized or unpolymerized.

The method in accordance with this invention involves essentially effecting the reaction of a monohydric heterocyclic alcohol and abietic acid in the presence of heat, and desirably though not necessarily also in the presence of a catalyst which will promote the reaction. Desirably also a hydrocarbon will be present to assist in the removal of water of reaction.

In preparing the composition in accordance with this invention abietic acid in the form, for example, of commercial abietic acid, or as present in wood or gum rosin may be used. Likewise and as equivalent for abietic acid a salt thereof as, for example, sodium or potassium abietate may be used.

As the monohydric heterocyclic alcohol there may be used, for example, furfuryl alcohol, hydroxy furfuryl alcohol, ethyl furfuryl alcohol, thienyl carbinol ($C_4H_3S$—$CH_2OH$), etc. and it will be understood that an inorganic ester of the monohydric heterocyclic alcohols, as, for example, furfuryl chloride, ethyl furfuryl bromide, thienyl carbinol chloride ($C_4H_3S$—$CH_2Cl$) etc. may be used equivalently for the alcohols when a salt of abietic acid is used.

When in preparing the composition in accordance with this invention a catalyst is used, such will desirably be an acid catalyst, as, for example, p-toluene sulphonic acid, hydrogen chloride, boric acid, or the like, and will be used in small quantity, say within about the range 0.01%–5.0% by weight on the reaction mass, in order that excessive polymerization of the alcohol will be avoided.

Where a hydrocarbon is used to assist in the removal of water of reaction, such may be, for example, toluene, xylene, mineral spirits, etc.

In proceeding for the preparation of the composition in accordance with this invention, the alcohol and abietic acid will be reacted in suitable proportions, it being desirable to provide some excess of alcohol. Where abietic acid is used in the form of a salt, such will desirably be used in alcoholic solution and the reaction will be carried out under pressure suitable at the temperature used to avoid loss of the alcohol. The reaction will be carried out at any desired temperature at which the reaction will take place, it being noted that the time required for completion of the reaction will depend upon the temperature used. As illustrative, the reaction may be desirably carried out at a temperature falling within about the range 50–300° C. Continuous esterification may be effected as by passing excess of the alcohol counter-currently to the rosin at a temperature of about 225–300° C.

As illustrative of the carrying out of the method in accordance with this invention, for example, 300 g. of commercial abietic acid, or equivalent amount of wood or gum rosin, and 400 g. of furfuryl alcohol are heated in any suitable form of apparatus, at about 160° C. for about 18 hours. The product may be then washed with an alkali solution, say a sodium carbonate solution, to remove any unreacted abietic acid and may be then subjected to steam distillation to remove volatiles.

In the above illustration, if desired, about 125 g. of toluene may be employed and will assist in the removal of water evolved during the reaction. Again, if desired, about 0.1 g. of p-toluene sulphonic acid may be included as a catalyst. Where a catalyst is used there may be some polymerization of the product and in such case the polymerized product, which will involve this invention, may be separated from the unpolymerized product by distillation in vacuo.

Where, for example, it is desired to use a salt of abietic acid in place of the acid or rosin, the composition may be produced by reacting about 125 g. of furfuryl chloride and 300 g. of sodium abietate in solution in 1000 g. of ethyl alcohol at a temperature of about 140° C. and under a pressure of about 125 pounds per square inch, for about 3 hours.

The composition in accordance with this invention will be found to be advantageous for use variously in the commercial arts and to be advantageous, for example, for use in lacquers as a colloiding agent for nitrocellulose.

What I claim and desire to protect by Letters Patent is:

1. An ester formed by the reaction of a monohydric heterocyclic alcohol and abietic acid.
2. An ester formed by the reaction of a monohydric heterocyclic alcohol and rosin.
3. An ester formed by the reaction of furfuryl alcohol and rosin.
4. Furfuryl abietate.
5. The method of producing the product of claim 1 which includes heating a mixture of a monohydric heterocyclic alcohol and abietic acid.

6. The method of producing the product of claim 1 which includes heating a mixture of a monohydric heterocyclic alcohol and abietic acid in the presence of an acid catalyst.

7. The method of producing the product of claim 1 which includes heating to a temperature at which the water of reaction will be distilled off a mixture of a monohydric heterocyclic alcohol and abietic acid in the presence of an acid catalyst and toluene.

8. An ester formed by the reaction of an alcohol containing a heterocyclic nucleus and rosin.

9. The method of producing the product of claim 4 which includes heating a mixture of furfuryl alcohol and abietic acid.

10. Hydroxy furfuryl abietate.

11. Ethyl furfuryl abietate.

12. The reaction product of hydroxy furfuryl alcohol and rosin.

13. The reaction product of ethyl furfuryl alcohol and rosin.

14. A reaction product of abietic acid with a monohydric heterocyclic alcohol selected from the group consisting of furfuryl alcohol, hydroxy furfuryl alcohol, ethyl furfuryl alcohol and thienyl carbinol ($C_4H_3S$—$CH_2OH$).

15. A reaction product of rosin acid with a monohydric heterocyclic alcohol selected from the group consisting of furfuryl alcohol, hydroxy furfuryl alcohol, ethyl furfuryl alcohol and thienyl carbinol ($C_4H_3S$—$CH_2OH$).

16. The method of producing an abietic acid ester which includes heating abietic acid with a monohydric heterocyclic alcohol selected from the group consisting of furfuryl alcohol, hydroxy furfuryl alcohol, ethyl furfuryl alcohol and thienyl carbinol ($C_4H_3S$—$CH_2OH$).

17. The method of producing a rosin acid ester which includes heating rosin acid with a monohydric heterocyclic alcohol selected from the group consisting of furfuryl alcohol, hydroxy furfuryl alcohol, ethyl furfuryl alcohol and thienyl carbinol ($C_4H_3S$—$CH_2OH$).

JOSEPH N. BORGLIN.